(12) United States Patent
Yen et al.

(10) Patent No.: US 10,199,187 B2
(45) Date of Patent: Feb. 5, 2019

(54) LUMINOUS KEYBOARD

(71) Applicants: LITE-ON ELECTRONICS (GUANGZHOU) LIMITED, Guangzhou (CN); LITE-ON TECHNOLOGY CORPORATION, Taipei (TW)

(72) Inventors: Ming-Fu Yen, New Taipei (TW); Chen-Yu Tsai, New Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 15/609,972

(22) Filed: May 31, 2017

(65) Prior Publication Data

US 2018/0122597 A1    May 3, 2018

(30) Foreign Application Priority Data

Oct. 28, 2016    (CN) .......................... 2016 1 0971211

(51) Int. Cl.
*H01H 13/83*    (2006.01)
*F21V 8/00*    (2006.01)

(52) U.S. Cl.
CPC .............. *H01H 13/83* (2013.01); *G02B 6/009* (2013.01); *G02B 6/0055* (2013.01); *G02B 6/0078* (2013.01); *H01H 2219/06* (2013.01); *H01H 2219/062* (2013.01)

(58) Field of Classification Search
CPC ............... H01H 13/83; H01H 2219/06; H01H 2219/062; H01H 2219/044; H01H 13/023; H01H 9/161; H01H 13/10; H01H 9/16; H01H 2219/036; H01H 2219/014; G02B 6/0078; G02B 6/009; G02B 6/0055; G02B 6/0091
See application file for complete search history.

(56) References Cited

U.S. PATENT DOCUMENTS

| 9,905,381 | B1 * | 2/2018 | Chen ..................... H01H 13/703 |
| 2010/0148994 | A1 * | 6/2010 | Lin ........................ H01H 13/83 341/22 |
| 2013/0306455 | A1 * | 11/2013 | Wang et al. ........... H01H 13/83 200/341 |
| 2018/0106956 | A1 * | 4/2018 | Wang ................... G02B 6/0083 |

* cited by examiner

*Primary Examiner* — Y M Lee
(74) *Attorney, Agent, or Firm* — Li & Cai Intellectual Property (USA) Office

(57) ABSTRACT

A luminous keyboard comprises a key assembly, a thin-film switch circuit board assembly, a base plate and a light guide plate. The key assembly is disposed on the thin-film switch circuit board assembly. The thin-film switch circuit board assembly is disposed on the base plate. The base plate is disposed on the light guide plate. The base plate and the light guide plate together form an aperture structure. The thin-film switch circuit board assembly includes a thin-film switch circuit board and a light-emitting unit. The thin-film switch circuit board forms a protrusion protruding toward the aperture structure. The light-emitting unit is disposed at the bottom surface of the protrusion and extends downward such that a lower end of the light-emitting unit is lower than a lower surface of the base plate so that the light-emitting unit emits light into the light guide plate directly.

16 Claims, 3 Drawing Sheets

LUMINOUS KEYBOARD

BACKGROUND OF THE INVENTION

1. Field of the Invention

The present invention relates to a luminous keyboard; in particular, to a thin, low-cost luminous keyboard with higher lighting efficiency.

2. Description of Related Art

A keyboard is an indispensable input device used with a computer for inputting characters, symbols and numbers. When choosing a keyboard, the users consider not only the functionality that a keyboard has but also the appearance of the keyboard. Accordingly, there are many kinds of luminous keyboards available in the market. A luminous keyboard is not only visually appealing, but also convenient when type in the dark.

A conventional luminous keyboard includes a backlight module located beneath the key assembly so that light emitted from the backlight module can be transmitted through the key assembly. For most conventional luminous keyboards, the backlight module is formed by attaching LEDs to a flexible printed circuit (FPC), which is then attached to a light guide plate or a reflection plate. However, this kind of backlight module has the flexible printed circuit with increased thickness and the costs.

In this regard, it is important to reduce the thickness, lower the cost and improve the lighting efficiency of conventional luminous keyboards. The applicant of the present invention provides an improved luminous keyboard to address the above objectives.

SUMMARY OF THE INVENTION

In order to achieve the aforementioned objects, according to an embodiment of the present invention, a luminous keyboard comprises a key assembly, a thin-film switch circuit board assembly, a base plate and a light guide plate. The key assembly is disposed on the thin-film switch circuit board assembly, the thin-film switch circuit board assembly is disposed on the base plate, and the base plate is disposed on the light guide plate. The base plate and the light guide together form at least one aperture structure passing through the base plate and the light guide plate. The thin-film switch circuit board assembly includes a thin-film switch circuit board and a light-emitting unit. The thin-film switch circuit board includes a protrusion that protrudes toward the at least one aperture structure. The light-emitting unit is disposed at the bottom surface of the protrusion and extends downward such that a lower end of the light-emitting unit is lower than a lower surface of the base plate so that the light-emitting unit emits light into the light guide plate directly.

In the present invention, the base plate and the light guide plate together form at least one aperture structure passing through the base plate and light guide plate, the thin-film switch circuit board including a protrusion protruding toward the at least one aperture structure, and the light-emitting unit being disposed on the bottom surface of the protrusion and extends downward such that a lower end of the light-emitting unit is lower than a lower surface of the base plate. By the above structural means, the cost and the thickness of the flexible printed circuit are reduced because attaching light-emitting units to the flexible printed circuit is no longer required. Furthermore, with the aperture structure formed by the base plate and the light guide plate and with the protrusion of the thin-film switch circuit board, the light emitted from the light-emitting unit will not be blocked by the base plate. Therefore, the lighting efficiency is improved because the light emitted from the light-emitting unit can be transmitted into the light guide plate directly.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 1:
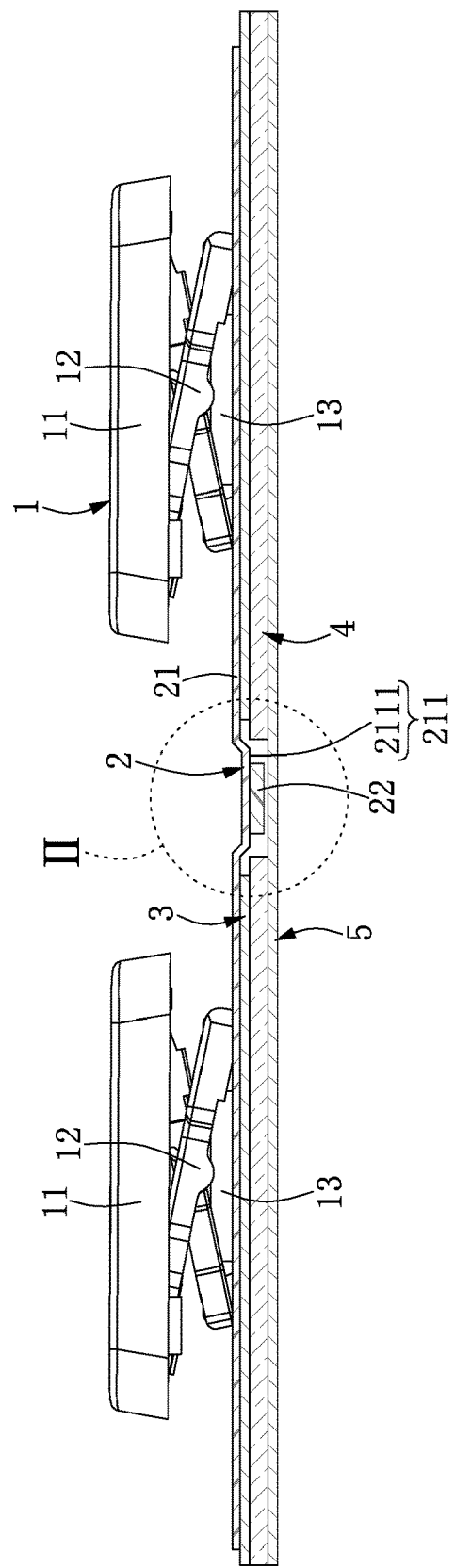
FIG. 1 shows a cross-sectional view of a luminous keyboard according to a first embodiment of the present invention.
Figure 2:
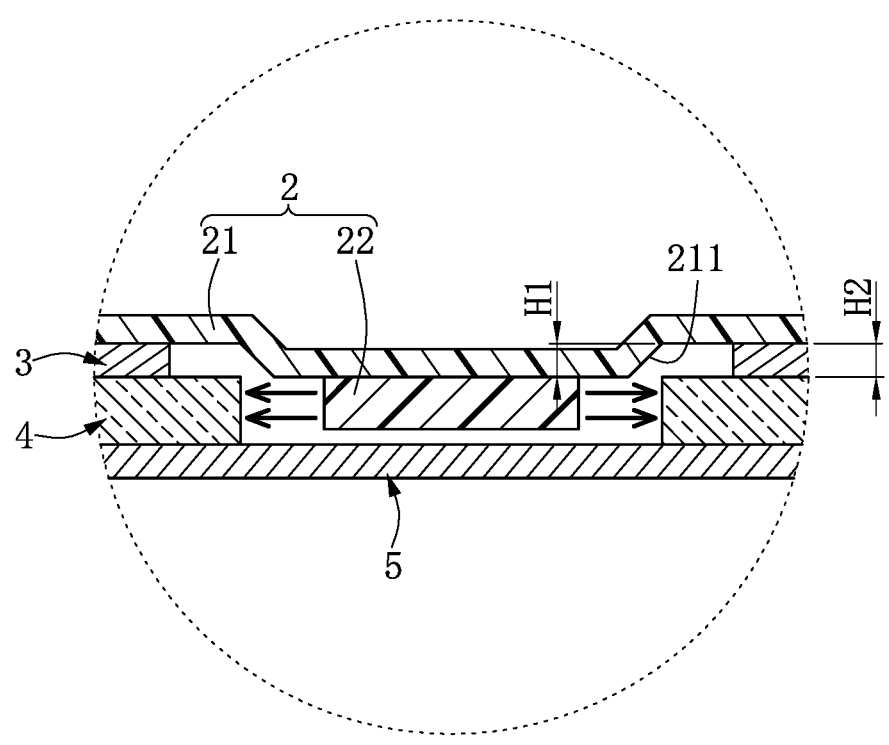
FIG. 2 shows a partial enlarged view of the area II of FIG. 1.
Figure 3:
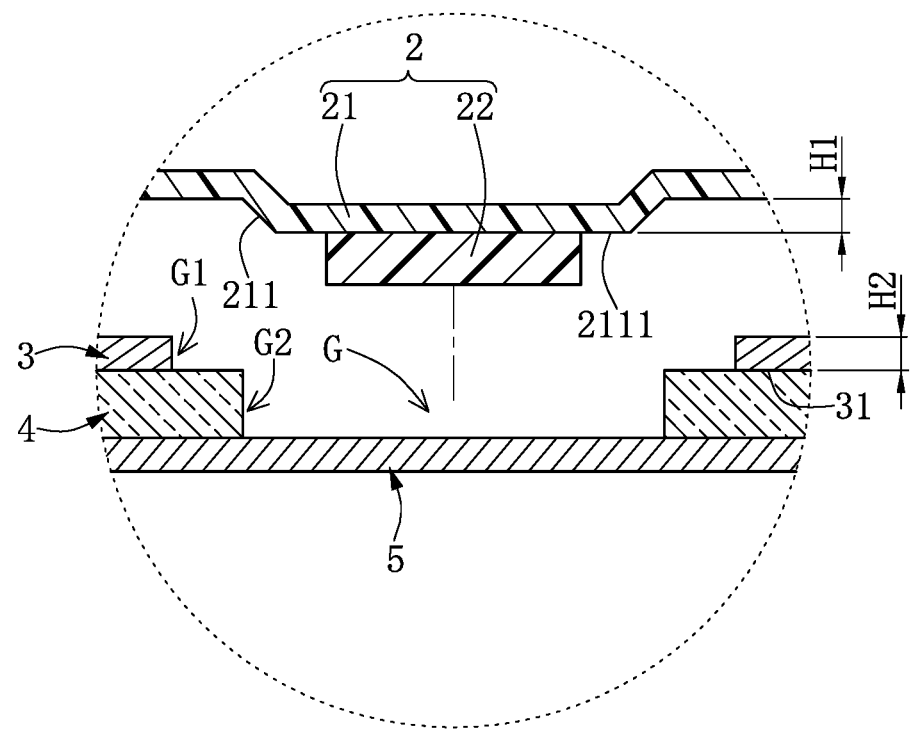
FIG. 3 shows a breakdown drawing of FIG. 2.

Referring to FIGS. 1 to 3, the present invention provides a luminous keyboard. Referring to FIG. 1, the luminous keyboard comprises a key assembly 1, a thin-film switch circuit board assembly 2, a base plate 3 and a light guide plate 4.

The key assembly 1 is disposed on the thin-film switch circuit board assembly 2, the thin-film switch circuit board assembly 2 is disposed on the base plate 3, and the base plate 3 is disposed on the light guide plate 4. That is to say, the key assembly 1, the thin-film switch circuit board assembly 2, the base plate 3 and the light guide plate 4 are arranged in layers sequentially.

The key assembly 1 includes a plurality of keycaps 11 and supporting units 12. The supporting units 12 are disposed between the keycaps 11 and the base plate 3 to support the keycaps 11 and make the keycaps 11 vertically movable with respect to the base plate 3. Each of the plurality of keycaps 11 is entirely or partly transparent, depending on the practical needs. In addition, the key assembly 1 further includes a plurality of elastic elements 13 disposed between the keycaps 11 and the thin-film switch circuit board assembly 2. When the keycap 11 is pressed, the thin-film switch circuit board assembly 2 is pressed by the elastic elements 2 between the keycap 11 and the thin-film switch circuit board 2 and generates a driving signal. The supporting unit 12 can be, but is not limited to, a scissor-mechanism; the elastic element 13 can be, but is not limited to, a rubber dome. However, the present invention is not limited by the form of the components of the key assembly 1.

The base plate 3 is made of metal or other appropriate materials. The base plate 3 is disposed on the light guide plate 4. The base plate 3 and the light guide plate 4 together form an aperture structure G passing through the base plate 3 and light guide plate 4, and the aperture structure G is in a step-like shape. In this embodiment, the aperture structure G is located between each two adjacent keycaps 11. In other embodiments, the aperture structure G can be located beneath each of the keycap 11. It is noteworthy that in a practical application, the base plate 3 can further includes a plurality of through holes (not shown in drawings), each of the through holes corresponds to each of the keycaps 11. The light guide plate 4 can also include a plurality of light guide structures (not shown in drawings) that correspond to the through holes respectively. The light guide structures guide light through the through holes and so that the light can light up the keycaps 11. The light guide structures can be, for example, a light guide ink (not shown in drawings) or a saw-tooth substructure (not shown in drawings). The present invention is not limited by the size, position and number of the through holes of the base plate 3, which can be adapted by a person having ordinary skill in the art according to practical needs.

The thin-film switch circuit board assembly 2 includes a thin-film switch circuit board 21 and at least one light-emitting unit 22 disposed on the bottom surface of thin-film switch circuit board 21. The thin-film switch circuit board 21 includes a protrusion 211 that protrudes toward the aperture structure G. Specifically, a height of the protrusion 211 (hereinafter H1) is smaller than, greater than or equal to a height of the base plate 3 (hereinafter H2) so that the bottom surface 2111 of the protrusion 211 is higher than, lower than or coplanar with the lower surface 31 of the base plate 3. The light-emitting unit 22, for example a LED, is disposed at the bottom surface 2111 of the protrusion 211 and extends downward such that a lower end of the light-emitting unit 22 is lower than the lower surface 31 of the base plate 3. In this regard, the light-emitting unit 22 emits light into the light guide plate 4 without being obstructed by the opaque base plate 3, and the lighting efficiency is improved.

Specifically, the thin-film switch circuit board 21 is transformed by an embossing process or a heat molding process to form the protrusion 211. In addition, the protrusion 211 protrudes from a side of the thin-film switch circuit board 21 and the other side thereof has a recessed portion corresponding to the protrusion so that the cross-sectional thickness of the thin-film switch circuit board 21 is constant.

More specifically, referring to FIG. 3, the aperture structure G is in a step-like shape. That is, the aperture structure G includes a first aperture G1 having a first diameter and a second aperture G2 having a second diameter. The first aperture G1 is formed through the base plate 3 and the second aperture G2 is formed through the light guide plate 4. In addition, the width of the bottom surface 2111 of the protrusion 211 is greater than the width of the light-emitting unit 22, the width of the bottom surface 2111 of the protrusion 211 is smaller than the first diameter of the first aperture G1, and the width of the light-emitting unit 22 is smaller than the second diameter of the second aperture G2.

In addition, the luminous keyboard according to this embodiment further comprises a reflection plate 5 disposed beneath the light guide plate 4 and covering the aperture structure G. The reflection plate 5 is coated with reflective materials such as reflective ink (not shown in drawings). The disposition of the reflection plate 5 further enhances the reflectivity of the illuminated film-covered keyboard of the instant disclosure.

In summary, in the present invention, the base plate 3 and the light guide 4 together form an aperture structure G passing through the base plate 3 and the light guide plate 4, the thin-film switch circuit board 21 forming a protrusion 211 protruding toward the aperture structure G, and the light-emitting unit 22 being disposed on the bottom surface 2111 of the protrusion 211 and extending downward such that a lower end of the light-emitting unit 22 is lower than a lower surface 31 of the base plate 3. By the above structural means, the cost and the thickness of the flexible printed circuit are reduced because attaching light-emitting units to the flexible printed circuit is no longer required. Furthermore, with the aperture structure formed by the base plate and the light guide plate and the protrusion of the thin-film switch circuit board, the light emitted from the light-emitting unit will not be blocked by the base plate. Therefore, the lighting efficiency is improved because the light emitted from the light-emitting unit can be transmitted into the light guide plate directly.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:

1. A luminous keyboard comprising:
   a key assembly, a thin-film switch circuit board assembly, a base plate and a light guide plate, the key assembly being disposed on the thin-film switch circuit board assembly, the thin-film switch circuit board assembly being disposed on the base plate, and the base plate being disposed on the light guide plate;
   wherein the base plate and the light guide plate together form at least one aperture structure passing through the base plate and the light guide plate, the thin-film switch circuit board assembly including a thin-film switch circuit board and a light-emitting diode, the thin-film switch circuit board including a protrusion that protrudes toward the at least one aperture structure, and the light-emitting diode being disposed at a bottom surface of the protrusion and extending downward such that a lower end of the light-emitting diode is lower than a lower surface of the base plate so that the light-emitting diode emits light into the light guide plate directly; and
   wherein the protrusion protrudes from a side of the thin-film switch circuit board, and the other side thereof has a recessed portion corresponding to the protrusion so that a cross-sectional thickness of the thin-film switch circuit board is constant.

2. The luminous keyboard according to claim 1, wherein a height of the protrusion is smaller than, greater than, or equal to a height of the base plate so that the bottom surface of the protrusion is lower than, higher than, or coplanar with the lower surface of the base plate.

3. The luminous keyboard according to claim 1, wherein the key assembly includes a plurality of keycaps and a plurality of supporting units, and the plurality of supporting units are disposed between the base plate and the plurality of keycaps to support the plurality of keycaps.

4. The luminous keyboard according to claim 3, wherein the at least one aperture structure is located between each two adjacent keycaps of the plurality of keycaps.

5. The luminous keyboard according to claim 3, wherein the at least one aperture structure is located beneath each of the plurality of keycaps.

6. The luminous keyboard according to claim 1, further comprising a reflection plate disposed beneath the light guide plate and covering the at least one aperture structure.

7. The luminous keyboard according to claim 1, wherein the at least one aperture structure is in a step-like shape, wherein the at least one aperture structure includes a first aperture having a first diameter and a second aperture having a second diameter, and the first aperture is formed through the base plate and the second aperture is formed through the light guide plate.

8. The luminous keyboard according to claim 7, wherein a width of the bottom surface of the protrusion is greater than a width of the light-emitting diode, the width of the bottom surface of the protrusion is smaller than the first diameter of the first aperture, and the width of the light-emitting diode is smaller than the second diameter of the second aperture.

9. A luminous keyboard comprising:
a key assembly, a thin-film switch circuit board assembly, a base plate and a light guide plate, the key assembly being disposed on the thin-film switch circuit board assembly, the thin-film switch circuit board assembly being disposed on the base plate, and the base plate being disposed on the light guide plate;
wherein the base plate and the light guide plate together form at least one aperture structure passing through the base plate and the light guide plate, the thin-film switch circuit board assembly including a thin-film switch circuit board and a light-emitting unit, the thin-film switch circuit board including a protrusion that protrudes toward the at least one aperture structure, and the light-emitting unit being disposed at a bottom surface of the protrusion and extending downward such that a lower end of the light-emitting unit is lower than a lower surface of the base plate so that the light-emitting unit emits light into the light guide plate directly;
wherein the protrusion protrudes from a side of the thin-film switch circuit board, and the other side thereof has a recessed portion corresponding to the protrusion so that a cross-sectional thickness of the thin-film switch circuit board is constant.

10. The luminous keyboard according to claim 9, wherein a height of the protrusion is smaller than, greater than, or equal to a height of the base plate so that the bottom surface of the protrusion is lower than, higher than, or coplanar with the lower surface of the base plate.

11. The luminous keyboard according to claim 9, wherein the key assembly includes a plurality of keycaps and a plurality of supporting units, and the plurality of supporting units are disposed between the base plate and the plurality of keycaps to support the plurality of keycaps.

12. The luminous keyboard according to claim 11, wherein the at least one aperture structure is located between each two adjacent keycaps of the plurality of keycaps.

13. The luminous keyboard according to claim 11, wherein the at least one aperture structure is located beneath each of the plurality of keycaps.

14. The luminous keyboard according to claim 9, further comprising a reflection plate disposed beneath the light guide plate and covering the at least one aperture structure.

15. The luminous keyboard according to claim 9, wherein the at least one aperture structure is in a step-like shape, wherein the at least one aperture structure includes a first aperture having a first diameter and a second aperture having a second diameter, and the first aperture is formed through the base plate and the second aperture is formed through the light guide plate.

16. The luminous keyboard according to claim 15, wherein a width of the bottom surface of the protrusion is greater than a width of the light-emitting unit, the width of the bottom surface of the protrusion is smaller than the first diameter of the first aperture, and the width of the light-emitting unit is smaller than the second diameter of the second aperture.

* * * * *